United States Patent
Ikeda et al.

(10) Patent No.: US 10,923,746 B2
(45) Date of Patent: Feb. 16, 2021

(54) FUEL CELL STACK

(71) Applicant: HONDA MOTOR CO., LTD., Tokyo (JP)

(72) Inventors: Yuta Ikeda, Wako (JP); Naoki Inoue, Wako (JP); Kimiharu Mizusaki, Wako (JP); Norihisa Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 45 days.

(21) Appl. No.: 16/364,350

(22) Filed: Mar. 26, 2019

(65) Prior Publication Data

US 2019/0305339 A1 Oct. 3, 2019

(30) Foreign Application Priority Data

Mar. 28, 2018 (JP) .............................. JP2018-062144

(51) Int. Cl.
*H01M 8/04082* (2016.01)
*H01M 8/2484* (2016.01)
*H01M 8/2475* (2016.01)

(52) U.S. Cl.
CPC ..... *H01M 8/04201* (2013.01); *H01M 8/2475* (2013.01); *H01M 8/2484* (2016.02)

(58) Field of Classification Search
CPC ........... H01M 8/04201; H01M 8/2484; H01M 8/2475; H01M 8/04
See application file for complete search history.

(56) References Cited

U.S. PATENT DOCUMENTS

2006/0110650 A1 5/2006 Sugiura et al.
2020/0179849 A1* 6/2020 Nishinakamura ...... B01D 45/00

FOREIGN PATENT DOCUMENTS

| JP | 2001093552 A | * | 4/2001 |
| JP | 2001250568 A | * | 9/2001 |
| JP | 2005317444 A | * | 11/2005 |
| JP | 5079994 | | 11/2012 |

OTHER PUBLICATIONS

EPO machine generated English translation of JP-2001-250568-A (Year: 2001).*
EPO machine generated English translation of JP-2005-317444-A (Year: 2005).*
English translation of JP-2001-093552-A obtained from Global Dossier (Year: 2001).*

* cited by examiner

*Primary Examiner* — Christopher P Domone
*Assistant Examiner* — Kimberly Wyluda
(74) *Attorney, Agent, or Firm* — Amin, Turocy & Watson, LLP

(57) ABSTRACT

At one end of a fuel cell stack in a stacking direction, an insulating plate and an end plate are provided. Further, a bypass channel connecting a reactant gas supply passage and a second reactant gas discharge passage is formed between a cell stack body and the end plate. An oxygen-containing gas supplied from a reactant gas supply passage is distributed to a first reactant gas discharge passage and the second reactant gas discharge passage in the fuel cell stack.

7 Claims, 5 Drawing Sheets

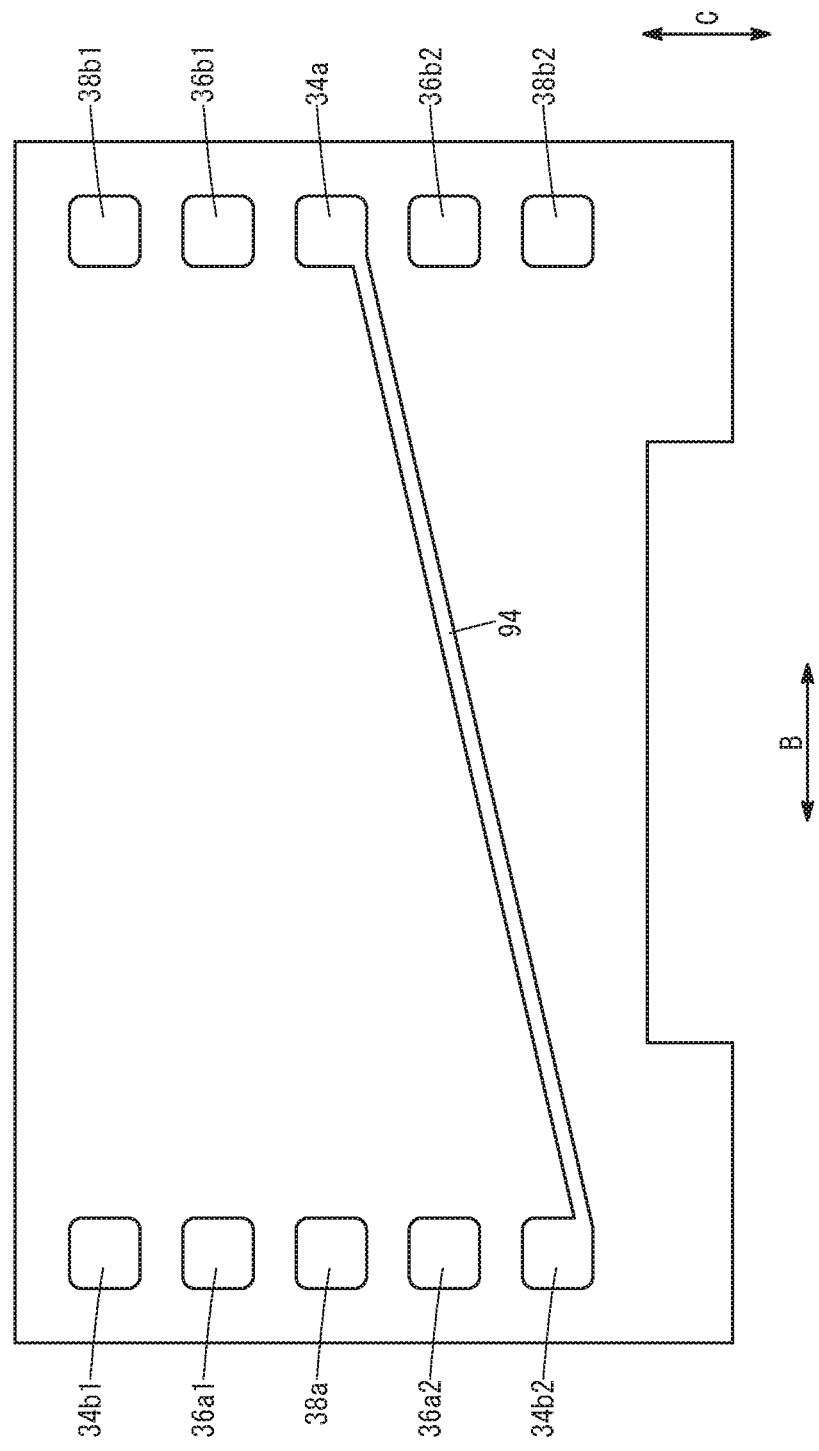

FUEL CELL STACK

CROSS-REFERENCE TO RELATED APPLICATION

This application is based upon and claims the benefit of priority from Japanese Patent Application No. 2018-062144 filed on Mar. 28, 2018, the contents of which are incorporated herein by reference.

BACKGROUND OF THE INVENTION

Field of the Invention

The present invention relates to a fuel cell stack including a cell stack body formed by stacking a plurality of power generation cells. Each of the power generation cells includes an electrolyte electrode assembly, and separators sandwiching the electrolyte electrode assembly. The electrolyte electrode assembly includes an electrolyte, and an anode and a cathode provided on both sides of the electrolyte.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA). The membrane electrode assembly includes the solid polymer electrolyte membrane, an anode provided on one surface of the solid polymer electrolyte membrane, and a cathode provided on the other surface of the solid polymer electrolyte membrane.

The membrane electrode assembly is sandwiched between the separators to form a power generation cell. A predetermined number of the power generation cells are stacked together to form a cell stack body. Further, terminal plates are provided at both ends of the cell stack body, insulating plates are provided outside the terminal plates, and end plates are provided outside the terminal plates to form a fuel cell stack. For example, the fuel cell stack is mounted in a vehicle, for supplying electrical energy to a traction driving source of the vehicle.

In this type of the fuel cell stack, a fuel gas flow field (reactant gas flow field) is formed between an anode and one of the separators, and an oxygen-containing gas flow field is formed between a cathode and the other of the separators. Further, a fuel gas supply passage for supplying a fuel gas to a fuel gas flow field, a fuel gas discharge passage for discharging the fuel gas, an oxygen-containing gas supply passage for supplying an oxygen-containing gas to the oxygen-containing gas flow field, and an oxygen-containing gas discharge passage for discharging the oxygen-containing gas extend through the cell stack body, the insulating plates, and the end plates in the stacking direction.

According to the disclosure of Japanese Patent No. 5079994, a bypass channel is formed in the insulating plate having the above structure. The bypass channel connects a fuel gas inlet passage (fuel gas supply passage) and a fuel gas outlet passage (fuel gas discharge passage). In the structure, since condensed water produced in the fuel gas supply passage flows into the fuel gas discharge passage through the bypass channel, intrusion of the condensed water into the cell stack body (power generation cells) is avoided. As a result, according to the disclosure, it is possible to achieve the desired power generation performance of the power generation cells.

SUMMARY OF THE INVENTION

A general object of the present invention is to provide a fuel cell stack having a plurality of reactant gas discharge passages.

A main object of the present invention is to provide a fuel cell stack which makes it possible to prevent stagnant water such as condensed water adjacent to a reactant gas supply passage from intruding into power generation cells.

According to one embodiment of the present invention, a fuel cell stack is provided, including a cell stack body including a plurality of power generation cells stacked in a stacking direction, the power generation cells each including an electrolyte electrode assembly, and separators sandwiching the electrolyte electrode assembly, the electrolyte electrode assembly including an electrolyte, and an anode and a cathode provided on both sides of the electrolyte, and terminal plates, insulating plates, and end plates provided at both ends of the cell stack body, wherein a reactant gas supply passage configured to supply a reactant gas to be supplied to the anode or the cathode, and a first reactant gas discharge passage and a second reactant gas discharge passage configured to discharge a partially consumed reactant gas discharged from the anode or the cathode, extend through at least the cell stack body, the insulating plates, and the end plates in the stacking direction, the reactant gas supply passage is formed at one end of the cell stack body in a horizontal direction, and the first reactant gas discharge passage and the second reactant gas discharge passage are formed at another end of the cell stack body in the horizontal direction, the first reactant gas discharge passage is positioned below the reactant gas supply passage, and the second reactant gas discharge passage is positioned above the reactant gas supply passage, and a bypass channel configured to connect the reactant gas supply passage and the first reactant gas discharge passage is formed between the cell stack body and the end plates.

As described above, in the present invention, the reactant gas supply passage, the first reactant gas discharge passage configured to discharge the reactant gas and positioned below the reactant gas supply passage, and the second reactant gas discharge passage configured to discharge the reactant gas and positioned above the reactant gas supply passage are provided. Further, the bypass channel is formed over the area from the reactant gas supply passage to the first reactant gas discharge passage. In the structure, the water such as the condensed water adjacent to the reactant gas discharge passage is guided to the first reactant gas discharge passage at the lower position through the bypass channel under the effect of the gravity.

Therefore, it is possible to prevent intrusion of water adjacent to the reactant gas supply passage into the cell stack body. Thus, it is possible to avoid the situation, e.g., where the reactant gas flow field is closed, and shortage of the reactant gas occurs in each of the power generation cells. As a result, it is possible to effectively prevent decrease in the power generation performance due to instability of the cell voltage and/or decrease in the cell voltage.

Additionally, degradation of the electrolyte membrane or the electrode catalyst and corrosion of the separators due to water retained in the cell stack body are prevented. Accordingly, the product life of the fuel cell stack is extended advantageously.

Preferably, a supply channel of a reactant gas supply pipe member configured to supply the reactant gas to the reactant gas supply passage is connected to the reactant gas supply passage through a joint including a tapered through hole with an opening enlarged toward the end plate in a tapered manner. When water such as the condensed water is present in the supply channel of the reactant gas supply pipe member, the water flows toward the reactant gas supply passage of the end plate through the tapered through hole. It is because the inner diameter of the tapered through hole gets larger (there is a gradient) in this direction, and the water can flow easily in this direction. That is, it becomes easy to eliminate the water in the supply channel.

Further, the joint may be inserted up to a position in a middle of the reactant gas supply passage of the insulating plate, and a step may be formed between an outlet end of the tapered through hole and the reactant gas supply passage of the insulating plate. It is because, in the presence of this step, since the gravity is applied to the water, the water drops (slides) down from the joint easily.

Further, preferably, the fuel cell stack includes a second insulating plate including the reactant gas supply passage, and the first reactant gas discharge passage, and the second reactant gas discharge passage between insulating plate and the terminal plate, and an annular projection oriented to the reactant gas supply passage of the insulating plate is formed around the reactant gas supply passage of the second insulating plate. In particular, an outer diameter of the annular projection may be smaller than an inner diameter of the reactant gas supply passage of the insulating plate.

In this case, the water discharged from the joint needs to go up in opposition to the gravity, to intrude into the reactant gas supply passage of the second insulating plate. Therefore, it becomes even more difficult for water to intrude into the cell stack body.

It should be noted that the bypass channel may be formed between the insulating plate and the second insulating plate. Further, in the case where the bypass channel starts from a position below the annular projection, the water can flow toward the first reactant gas discharge passage more easily. It is because the gravity is applied to the water. Thus, intrusion of the water into the cell stack body becomes even more difficult.

For example, the bypass channel may be formed between the reactant gas supply passage configured to supply an oxygen-containing gas to the cathode (oxygen-containing gas supply passage), and the first reactant gas discharge passage of the two reactant gas discharge passages (oxygen-containing gas discharge passages) configured to discharge a partially consumed oxygen-containing gas discharged from the cathode. Thus, it is possible to prevent intrusion of the condensed water, etc. at the inlet of the cathode into the cell stack body.

In the present invention, the bypass channel is provided over the area from the reactant supply passage to the first reactant gas discharge passage provided at a position lower than the reactant gas supply passage, of the two reactant gas discharge passage for discharging the reactant gas. When water such as condensed water is present adjacent to the reactant gas supply passage, the water is guided to the first reactant gas discharge passage provided at the lower position through the bypass channel under the effect of the gravity.

Thus, it is possible to prevent intrusion of the water adjacent to the reactant gas supply passage into the cell stack body. Therefore, it is possible to avoid the situation, e.g., where the reactant gas flow field is closed, and shortage of the reactant gas occurs in each of the power generation cells. Accordingly, it is possible to effectively prevent decrease in the power generation performance due to instability of the cell voltage and/or decrease in the cell voltage.

Moreover, degradation of the electrolyte membrane or the electrode catalyst due to stagnant water retained in the cell stack body, and corrosion of the separators are prevented. Accordingly, the product life of the fuel cell stack is extended advantageously.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a schematic front view showing an end surface of an inner insulating plate of the fuel cell stack in FIG. 1, facing an outer insulating plate.

DESCRIPTION OF THE PREFERRED EMBODIMENTS

Hereinafter, a preferred embodiment of a fuel cell stack according to the present invention will be described with reference to the accompanying drawings.

Figure 1:
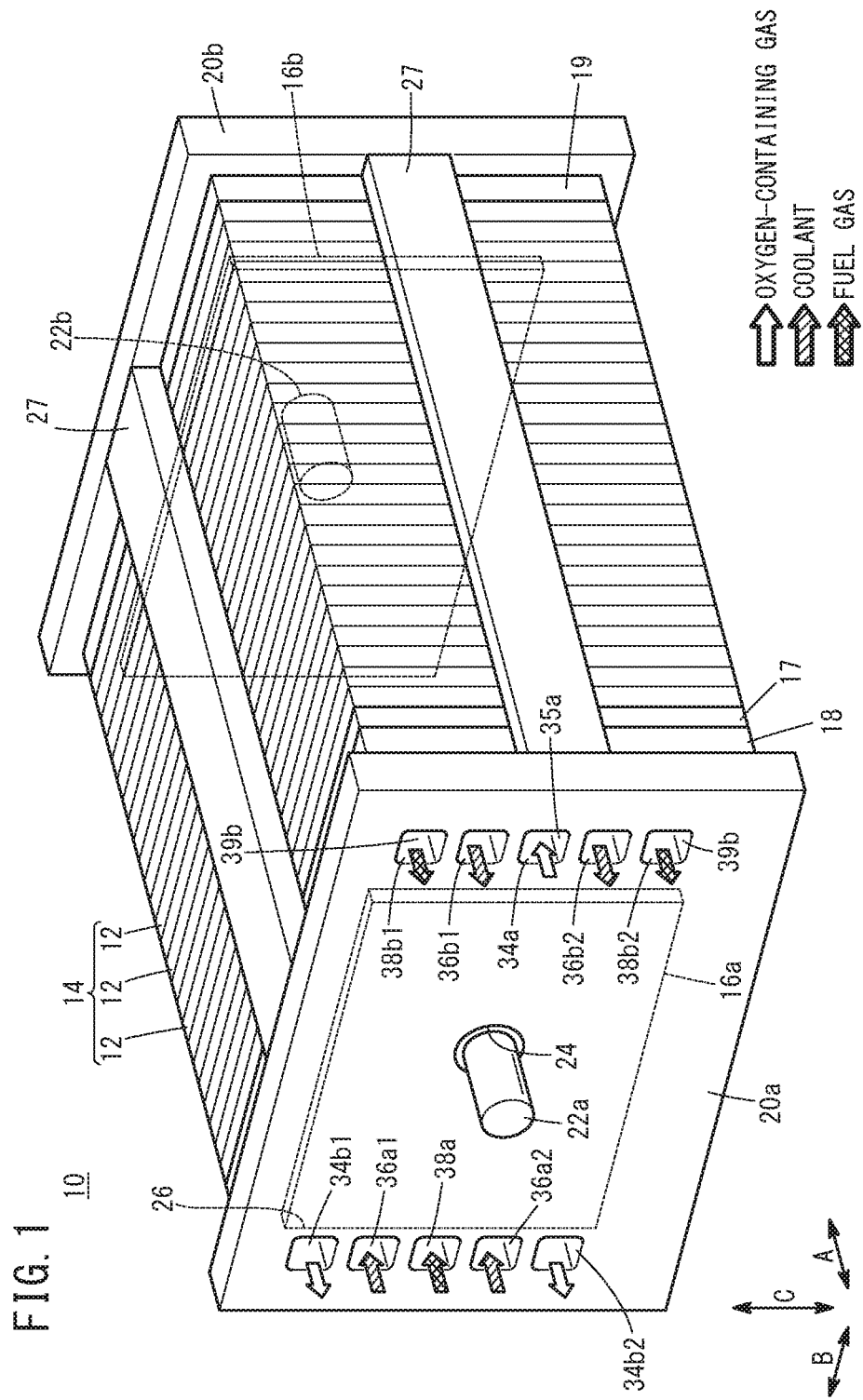
FIG. 1 is an overall perspective view showing a fuel cell stack according to an embodiment of the present invention.

FIG. 1 is an overall perspective view showing a fuel cell stack 10 according to an embodiment of the present invention. The fuel cell stack 10 includes a cell stack body 14 formed by stacking a plurality of power generation cells 12 in a horizontal direction indicated by an arrow A. For example, the fuel cell stack 10 is mounted in a fuel cell vehicle such as a fuel cell electric automobile (not shown). It should be noted that a direction indicated by an arrow B is perpendicular to a direction indicated by an arrow A, and a direction indicated by an arrow C is a vertical direction (gravity direction).

At one end of the cell stack body 14 in the stacking direction indicated the arrow A, a terminal plate 16a for collecting electrical energy is provided. An inner insulating plate (second insulating plate) 17 is provided outside the terminal plate 16a. An outer insulating plate 18 (insulating plate) is provided outside the inner insulating plate 17. An end plate 20a is provided outside the outer insulating plate 18. At the other end of the cell stack body 14 in the stacking direction, a terminal plate 16b is provided. An insulating plate 19 is provided outside the terminal plate 16b. An end plate 20b is provided outside the insulating plate 19.

Figure 2:
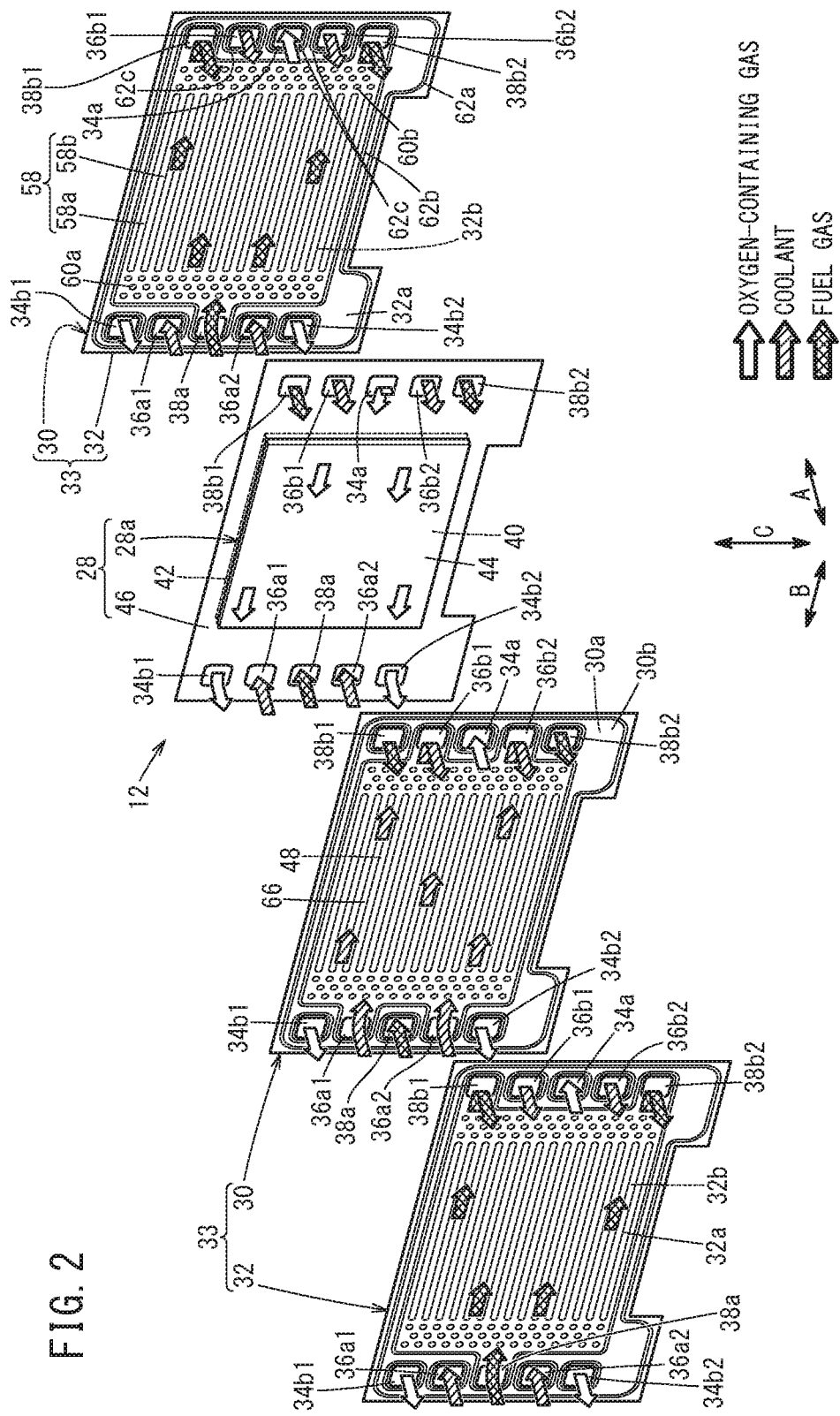
FIG. 2 is an exploded perspective view of a power generation cell.

The terminal plates 16a, 16b are current collectors. An anode 42 (or cathode 44) of each of the power generation cells 12 is electrically connected to the terminal plate 16a. A cathode 44 (or anode 42) of each of the power generation cells 12 is electrically connected to the terminal plate 16b. The anode 42 and the cathode 44 are shown in FIG. 2.

Terminals 22a, 22b are formed at substantially central positions of the terminal plates 16a, 16b. The terminals 22a, 22b protrude outward in the stacking direction. The terminals 22a, 22b have a substantially columnar shape, and the majority of parts of the side walls of the terminals 22a, 22b are covered with insulating cylinders (not shown). The insulating cylinders are interposed between the terminals 22a, 22b and inner walls of passage holes 24 formed in the inner insulating plate 17, the outer insulating plate 18, the insulating plate 19, and the end plates 20a, 20b. In particular, the insulating cylinders provide electrical insulation between the terminals 22a, 22b and the end plates 20a, 20b. Front ends of the terminals 22a, 22b which are not covered with the insulating cylinders are exposed to the outside of the end plates 20a, 20b in the stacking direction.

The inner insulating plate (second insulating plate) 17 and the insulating plate 19 are made of insulating material. Recesses 26 are formed in the inner insulating plate (second insulating plate) 17 and the insulating plate 19, respectively, at the center of the end surfaces on the inner side in the stacking direction. The recesses 26 are depressed outward in the stacking direction. The terminal plates 16a, 16b are accommodated in the recesses 26, respectively.

The outer insulating plate (insulating plate) 18 is made of insulating material as well. For example, the above inner insulating plate 17, the outer insulating plate 18, and the insulating plate 19 are made of electrically insulating resin such as polycarbonate (PC) resin, phenol resin, etc.

Each of the end plates 20a, 20b has a rectangular shape elongated in a lateral direction (or elongated in a vertical direction). Coupling bars 27 are provided between the sides of the end plates 20a, 20b, respectively. Both ends of each of the coupling bars 27 are fixed to inner surfaces of the end plates 20a, 20b, and a tightening load in the stacking direction (indicated by the arrow A) is applied to the cell stack body 14. Instead of adopting the structure, the cell stack body 14 may be placed in the casing including the end plates 20a, 20b.

As shown in FIG. 2, the power generation cell 12 is formed by sandwiching a resin frame equipped MEA 28 between a first metal separator 30 and a second metal separator 32. Each of the first metal separator 30 and the second metal separator 32 is formed by press forming of a metal thin plate to have a corrugated shape in cross section. For example, the metal plate is a steel plate, a stainless steel plate, an aluminum plate, a plated steel plate, or a metal plate having an anti-corrosive surface by surface treatment. Outer ends of the first metal separator 30 and the second metal separator 32 are joined together by welding, brazing, crimping, etc. to form a joint separator 33.

The resin frame equipped MEA 28 includes a membrane electrode assembly 28a (hereinafter referred to as the "MEA 28a") and a resin frame member 46 joined to the outer end of the MEA 28a, and provided around the outer end of the MEA 28a. The MEA 28a includes an electrolyte membrane 40, the anode 42 provided on one surface of the electrolyte membrane 40, and the cathode 44 provided on the other surface of the electrolyte membrane 40.

For example, the electrolyte membrane 40 is a solid polymer electrolyte membrane (cation ion exchange membrane). The electrolyte membrane 40 is a thin membrane of perfluorosulfonic acid containing water, for example. The electrolyte membrane 40 is interposed between the anode 42 and the cathode 44. A fluorine based electrolyte may be used as the electrolyte membrane 40. Alternatively, an HC (hydrocarbon) based electrolyte may be used as the electrolyte membrane 40.

Though not shown in detail, the anode 42 includes a first electrode catalyst layer joined to one surface of the electrolyte membrane 40 and a first gas diffusion layer stacked on the first electrode catalyst layer. The cathode 44 includes a second electrode catalyst layer joined to the other surface of the electrolyte membrane 40 and a second gas diffusion layer stacked on the second electrode catalyst layer.

Figure 3:
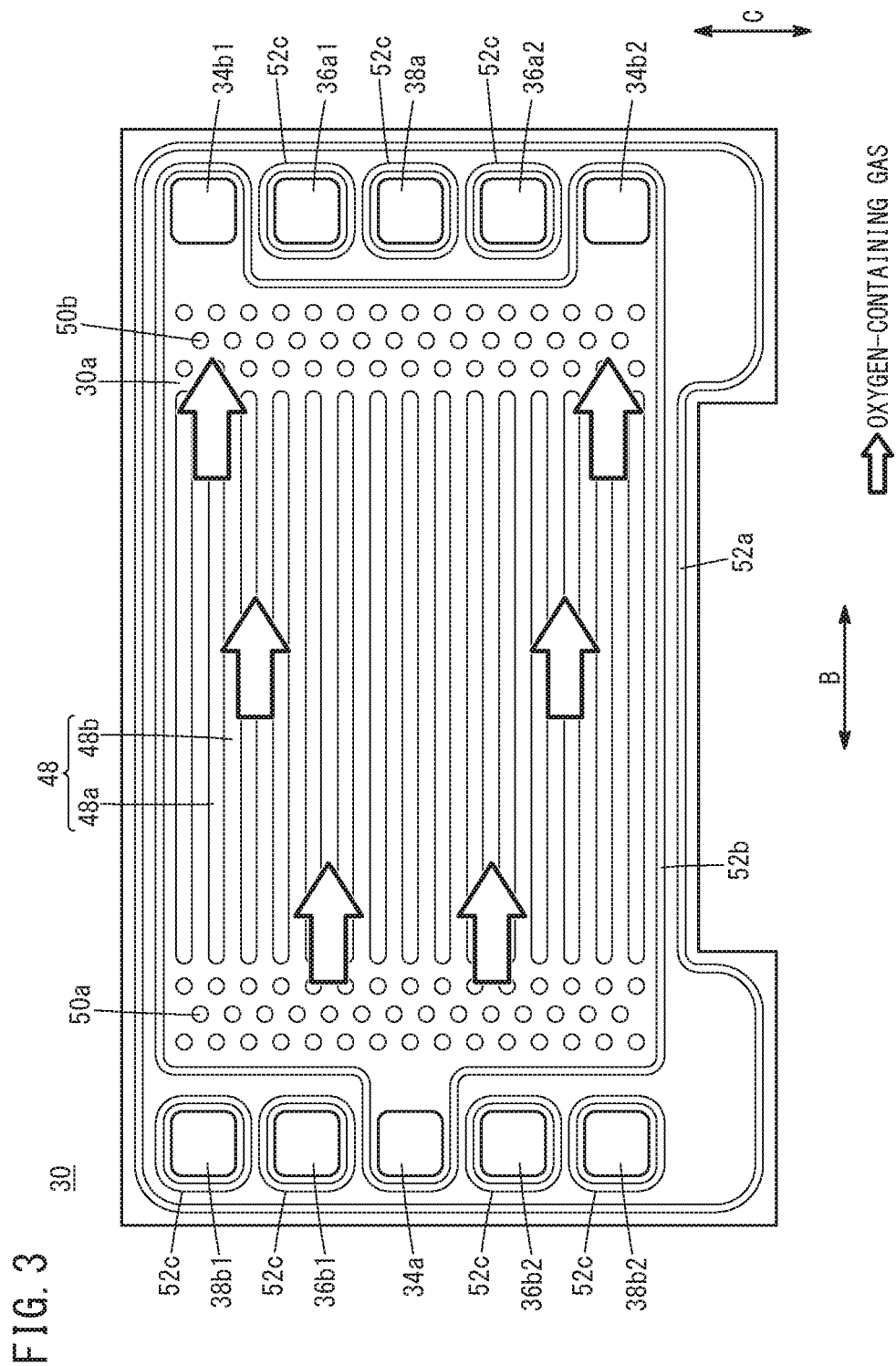
FIG. 3 is a view showing structure of a first metal separator as viewed from a side where an oxygen-containing gas flow field is present.

As shown in FIG. 3, the first metal separator 30 has an oxygen-containing gas flow field 48 on its surface 30a facing the resin frame equipped MEA 28. For example, the oxygen-containing gas flow field 48 extends in the direction indicated by the arrow B. The oxygen-containing gas flow field 48 is connected to an oxygen-containing gas supply passage 34a, an upper oxygen-containing gas discharge passage 34b1, and a lower oxygen-containing gas discharge passage 34b2. The oxygen-containing gas flow field 48 includes straight flow grooves (or wavy flow grooves) 48b between a plurality of ridges 48a extending in the direction indicated by the arrow B.

An inlet buffer 50a is provided between the oxygen-containing gas supply passage 34a and the oxygen-containing gas flow field 48 by press forming. A plurality of bosses protruding toward the MEA 28 are formed in the inlet buffer 50a. An outlet buffer 50b is provided between the upper oxygen-containing gas discharge passages 34b1 and the lower oxygen-containing gas discharge passage 34b2, and the oxygen-containing gas flow field 48, by press forming. A plurality of bosses protruding toward the MEA 28 are formed in the outlet buffer 50b.

A plurality of metal bead seals are formed on the surface 30a of the first metal separator 30 by press forming. The metal bead seals are expanded toward the resin frame equipped MEA 28. Instead of the bead seal, a ridge shaped elastic seal made of elastic material may be provided. The plurality of meal bead seals include an outer bead 52a, an inner bead 52b, and a plurality of passage beads 52c. The outer bead 52a is provided along the outer end of the surface 30a. The inner bead 52b is provided around the oxygen-containing gas flow field 48, the oxygen-containing gas supply passage 34a, the upper oxygen-containing gas discharge passage 34b1, and the lower oxygen-containing gas discharge passages 34b2, while allowing the oxygen-containing gas flow field 48 to be connected to the oxygen-containing gas supply passage 34a, the upper oxygen-containing gas discharge passage 34b1, and the lower oxygen-containing gas discharge passages 34b2.

The plurality of passage beads 52c are formed around a fuel gas supply passage 38a, upper fuel gas discharge passages 38b1, lower fuel gas discharge passage 38b2, an upper coolant supply passages 36a1, a lower coolant supply passage 36a2, an upper coolant discharge passage 36b1, and a lower coolant discharge passages 36b2, respectively. The outer bead 52a may be provided as necessary, and the outer bead 52a may be dispensed with.

As shown in FIG. 2, the second metal separator 32 has a fuel gas flow field 58 on its surface 32a facing the frame equipped MEA 28. For example, the fuel gas flow field 58 extends in a direction indicated by an arrow B. The fuel gas flow field 58 is connected to the fuel gas supply passage 38a, the upper fuel gas discharge passage 38b1, and the lower fuel gas discharge passage 38b2. The fuel gas flow field 58 includes a plurality of straight flow grooves (or wavy flow groves) 58b extending straight between a plurality of ridges 58a in the direction indicated by the arrow B.

An inlet buffer 60a is provided between the fuel gas supply passage 38a and the fuel gas flow field 58 by press forming. A plurality of bosses protruding toward the MEA 28 are formed in the inlet buffer 60a. An outlet buffer 60b is formed between the upper fuel gas discharge passages 38b1, the lower fuel gas discharge passage 38b2, and the fuel gas flow field 58 by press forming. A plurality of bosses protruding toward the MEA 28 are formed in the outlet buffer 60b.

A plurality of metal bead seals are formed on the surface 32a of the second metal separator 32 by press forming. The metal bead seals are expanded toward the resin frame equipped MEA 28. Instead of metal the bead seals, ridge shaped elastic seals made of elastic material may be provided. The plurality of meal bead seals include an outer bead 62a, an inner bead 62b, and a plurality of passage beads 62c. The outer bead 62a is provided along the outer end of the surface 32a. The inner bead 62b is provided inside the outer bead 62a, around the fuel gas flow field 58, the fuel gas supply passage 38a, the upper fuel gas discharge passages 38b1, and the lower fuel gas discharge passage 38b2 while allowing the fuel gas flow field 58 to be connected to the fuel gas supply passage 38a and the upper and lower fuel gas discharge passages 38b1, 38b2.

The plurality of passage beads 62c are formed around the oxygen-containing gas supply passage 34a, the upper oxygen-containing gas discharge passage 34b1 the lower oxygen-containing gas discharge passage 34b2, the upper coolant supply passage 36a1, the lower coolant supply passage 36a2, the upper coolant discharge passage 36b1, and the lower coolant discharge passage 36b2, respectively. The outer bead 62a may be provided as necessary, and the outer bead 62a may be dispensed with.

A coolant flow field 66 is formed between a surface 30b of the first metal separator 30 and the surface 32a of the second metal separator 32 that are joined together by welding or by brazing. The coolant flow field 66 is connected to the upper coolant supply passages 36a1, the lower coolant supply passage 36a2, the upper coolant discharge passage 36b1, and the lower coolant discharge passages 36b2. The coolant flow field 66 is formed by stacking a surface of the first metal separator 30 on the back of the oxygen-containing gas flow field 48 and a surface of the second metal separator 32 on the back of the fuel gas flow field 58.

As in the case of the cell stack body 14, at one end of the end plate 20a, the outer insulating plate 18, and the inner insulating plate 17 in the direction indicated by the arrow B (horizontal direction) perpendicular to the stacking direction indicated by the arrow A, the upper fuel gas discharge passage 38b1 (second reactant gas discharge passage), the upper coolant discharge passage 36b1, the oxygen-containing gas supply passage 34a (reactant gas supply passage), the lower coolant discharge passage 36b2, the lower fuel gas discharge passage 38b2 (first reactant gas discharge passage) are provided. The upper fuel gas discharge passage 38b1, the upper coolant discharge passage 36b1, the oxygen-containing gas supply passage 34a, the lower coolant discharge passage 36b2, the lower fuel gas discharge passage 38b2 extend through the end plate 20a, the outer insulating plate 18, and the inner insulating plate 17 in the direction indicated by the arrow A. The fluid passages may be arranged in one line in the gravity direction indicated by the arrow C. Alternatively, the fluid passages may be provided in so called a zigzag pattern.

A fuel gas such as a hydrogen gas as one of reactant gases is discharged through the upper fuel gas discharge passage 38b1 and the lower fuel gas discharge passage 38b2. An oxygen-containing gas as the other reactant gas is supplied through the oxygen-containing gas supply passage 34a. For example, suitable coolant such as water, oil, ethylene glycol is discharged through the upper coolant discharge passage 36b1 and the lower coolant discharge passage 36b2.

The oxygen-containing gas supply passage 34a is positioned between the upper coolant discharge passage 36b1 and the lower coolant discharge passage 36b2. Further, the upper fuel gas discharge passage 38b1 is positioned above the upper coolant discharge passage 36b1, and the lower fuel gas discharge passage 38b2 is provided below the lower coolant discharge passage 36b2.

At the other end of the fuel cell stack 10 in the direction indicated by the arrow B, an upper oxygen-containing gas discharge passage 34b1 (second reactant gas discharge passage), the upper coolant supply passage 36a1, the fuel gas supply passage 38a (reactant gas supply passage), the lower coolant supply passage 36a2, and a lower oxygen-containing gas discharge passage 34b2 (first reactant gas discharge passage) are provided. The upper oxygen-containing gas discharge passage 34b1, the upper coolant supply passage 36a1, the fuel gas supply passage 38a, the lower coolant supply passage 36a2, and the lower oxygen-containing gas discharge passage 34b2 extend through the fuel cell stack 10 in the direction indicated by the arrow A. These fluid passages are arranged in the gravity direction indicated by the arrow C. Alternatively, the fluid passages may be provided in so called a zigzag pattern.

The fuel gas to be discharged from the upper fuel gas discharge passage 38b1 and the lower fuel gas discharge passage 38b2 is supplied through the fuel gas supply passage 38a. The coolant to be discharged from the upper coolant discharge passage 36b1 and the lower coolant discharge passage 36b2 is supplied through the upper coolant supply passage 36a1 and the lower coolant supply passage 36a2. The oxygen-containing gas supplied from the oxygen-containing gas supply passage 34a is discharged through the upper oxygen-containing gas discharge passage 34b1 and the lower oxygen-containing gas discharge passage 34b2.

The fuel gas supply passage 38a is positioned between the upper coolant supply passage 36a1 and the lower coolant supply passage 36a2 spaced in the vertical direction. Further, the upper oxygen-containing gas discharge passage 34b1 is positioned above the upper coolant supply passage 36a1, and the lower oxygen-containing gas discharge passage 34b2 is positioned below the lower coolant supply passage 36a2.

That is, in the embodiment of the present invention, the oxygen-containing gas supply passage 34a for supplying the oxygen-containing gas and the upper oxygen-containing gas discharge passage 34b1 and the lower oxygen-containing gas discharge passage 34b2 for discharging the oxygen-containing gas are formed at opposite ends on both sides of the terminal 22a. Further, the lower oxygen-containing gas discharge passage 34b2 is provided at a position below the oxygen-containing gas supply passage 34a, and the upper oxygen-containing gas discharge passage 34b1 is provided at a position above the oxygen-containing gas supply passage 34a. Likewise, the fuel gas supply passage 38a, the lower fuel gas discharge passage 38b2, the upper fuel gas discharge passage 38b1 are provided at opposite ends on both sides of the terminal 22a. The lower fuel gas discharge passage 38b2 is provided at a position below the fuel gas supply passage 38a, and the upper fuel gas discharge passage 38b1 is provided at a position above the fuel gas supply passage 38a.

For example, the upper fuel gas discharge passage 38b1 and the lower fuel gas discharge passage 38b2 are connected together through a first connection channel (not shown) provided in the insulating plate 19. Likewise, the upper oxygen-containing gas discharge passage 34b1 and the lower oxygen-containing gas discharge passage 34b2 are connected together through a second connection channel (not shown) provided in the insulating plate 19. The first connection channel and the second connection channel may be provided for the terminal plate 16b or the end plate 20b.

Figure 4:
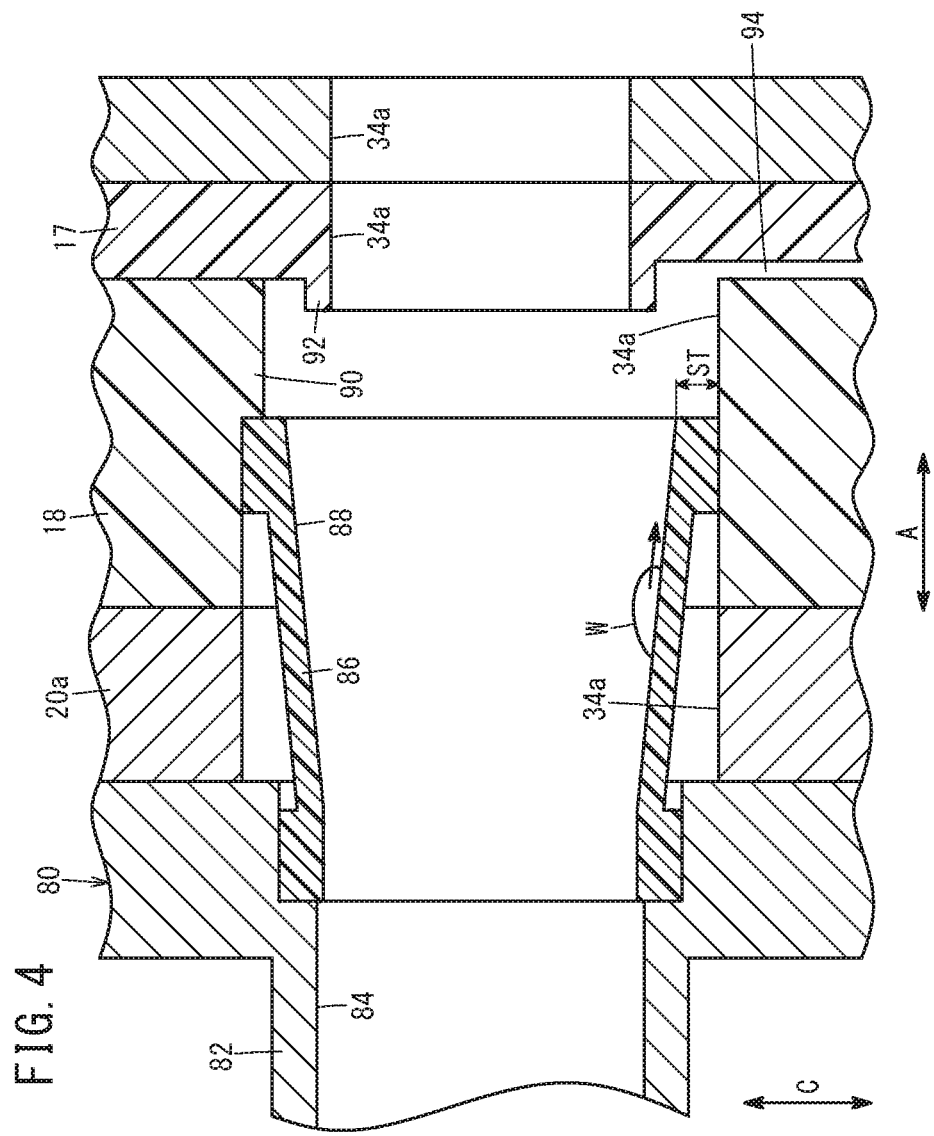
FIG. 4 is a schematic cross sectional view taken in a stacking direction indicated by an arrow A, adjacent to an oxygen-containing gas supply passage.

A manifold 80 (reactant gas supply pipe member) partially shown in FIG. 4 is provided in the end plate 20a. FIG. 4 shows an oxygen-containing gas supply pipe 82, and an oxygen-containing gas supply channel 84 is provided inside the oxygen-containing gas supply pipe 82.

An outlet end of the oxygen-containing gas supply pipe 82 is overlapped with the oxygen-containing gas supply passage 34a of the end plate 20a. Therefore, the oxygen-containing gas supply channel 84 is connected to the oxygen-containing gas supply passage 34a. The oxygen-containing gas supply passage 34a may have a circular cylindrical shape.

In this regard, an intermediate joint 86 is fitted to the outlet end of the oxygen-containing gas supply pipe 82. The intermediate joint 86 has a hollow circular truncated conical shape, and both ends of the intermediate joint 86 are opened. The intermediate joint 86 has an opening enlarged in a tapered manner from the manifold 80 toward the outer insulating plate 18. Therefore, the inner diameter of a tapered through hole 88 formed inside the intermediate joint 86 is increased gradually from the manifold 80 toward the outer insulating plate 18.

A stopper 90 is formed in the oxygen-containing gas supply passage 34a of the outer insulating plate 18. The stopper 90 protrudes in a circular arc shape. A front end surface at one end of the intermediate joint 86 having the enlarged opening contacts the stopper 90. As a result, the intermediate joint 86 is inserted up to a position in the middle of the oxygen-containing gas supply passage 34a of the outer insulating plate 18, and stopped. A step ST corresponding to the thickness of the intermediate joint 86 is formed between the intermediate joint 86 and the inner wall of the oxygen-containing gas supply passage 34a.

An annular projection 92 oriented toward the outer insulating plate 18 protrudes adjacent to an inlet of the oxygen-containing gas supply passage 34a of the inner insulating plate 17. The sizes of the annular projection 92 in the vertical direction indicated by the arrow C and the lateral direction indicated by the arrow A are smaller than the size of the oxygen-containing gas supply passage 34a of the outer insulating plate 18 in the vertical direction and the lateral direction. The front end of the annular projection 92 enters the oxygen-containing gas supply passage 34a of the outer insulating plate 18. In the case where the oxygen-containing gas supply passage 34a provided in the outer insulating plate 18 has a circular shape, the outer diameter of the annular projection 92 may preferably be smaller than the inner diameter of the oxygen-containing gas supply passage 34a.

As shown in FIG. 5, an annular bypass channel 94 is formed at an end surface of the inner insulating plate 17 facing the outer insulating plate 18. The bypass channel 94 extends from a lower part of the oxygen-containing gas supply passage 34a toward the lateral side of the lower oxygen-containing gas discharge passage 34b2. That is, the bypass channel 94 starts from a position below the annular projection 92, and extends as clearance formed between the inner insulating plate 17 and the outer insulating plate 18. A seal member (not shown) is provided outside the bypass channel 94.

Since the position of the oxygen-containing gas supply passage 34a is higher than the position of the lower oxygen-containing gas discharge passage 34b2, the bypass channel 94 is inclined from the direction indicated by the arrow B, downward from the oxygen-containing gas supply passage 34a toward the lower oxygen-containing gas discharge passage 34b2.

In the embodiment of the present invention, as shown in FIG. 1, the outer portion of the terminal plate 16a in the direction indicated by the arrow B is positioned inside the 10 fluid passages. It should be noted that the size of the terminal plate 16a in the direction indicated by the arrow B may be increased to provide the 10 fluid passages in the terminal plate 16a as well.

The fuel cell stack 10 according to the embodiment of the present invention basically has the structure as described above. Next, operation and working effects of the fuel cell stack 10 will be described below.

In operation of the fuel cell stack 10, as shown in FIG. 1, an oxygen-containing gas such as the pressurized air is supplied to the oxygen-containing gas supply passage 34a of the end plate 20a. In the meanwhile, a fuel gas such as a hydrogen-containing gas, e.g., hydrogen is supplied to the fuel gas supply passage 38a of the end plate 20a. Further, coolant such as pure water, ethylene glycol, or oil is supplied to the upper coolant supply passage 36a1 and the lower coolant supply passage 36a2 of the end plate 20a.

As shown in FIG. 2, the fuel gas flows from the fuel gas supply passage 38a into the fuel gas flow field 58 of the second separator 32. The fuel gas flows along the fuel gas flow field 58 in the direction indicated by the arrow B, and the fuel gas is supplied to the anode 42 of the MEA 28a.

As shown in FIG. 3, the oxygen-containing gas flows from the oxygen-containing gas supply passage 34a into the oxygen-containing gas flow field 48 of the first metal separator 30. The oxygen-containing gas flows along the oxygen-containing gas flow field 48 in the direction indicated by the arrow B, and the oxygen-containing gas is supplied to the cathode 44 of the MEA 28a.

Thus, in each MEA 28a, the fuel gas supplied to the anode 42 and the oxygen-containing gas supplied to the cathode 44 are partially consumed in the electrochemical reactions in the first electrode catalyst layer and the second electrode catalyst layer to generate electricity. Further, the coolant supplied to the upper coolant supply passage 36a1 and the lower coolant supply passage 36a2 flows into the coolant flow field 66 formed between the first metal separator 30 and the second metal separator 32, and then, the coolant flows in the direction indicated by the arrow B. After this coolant cools the MEA 28a, the coolant is discharged through the upper coolant discharge passage 36b1 and the lower coolant discharge passage 36b2.

An external load such as a motor is electrically connected to the terminals 22a, 22b. The electrical energy obtained by power generation of the fuel cell stack 10 is consumed by the external load.

The fuel gas supplied to, and partially consumed at the anode 42 (partially consumed reactant gas) is distributed to the upper fuel gas discharge passage 38b1 and the lower fuel gas discharge passage 38b2, and the fuel gas is discharged in the direction indicated by the arrow A. Further, the oxygen-containing gas supplied to, and partially consumed at the cathode 44 (partially consumed reactant gas) is distributed to the upper oxygen-containing gas discharge passage 34b1 and the lower oxygen-containing gas discharge passage 34b2, and the oxygen-containing gas flows is discharged in the direction indicated by the arrow A.

In this regard, before the oxygen-containing gas is supplied to the fuel cell stack 10, the oxygen-containing gas is humidified by adding water to the oxygen-containing gas to maintain the electrolyte membrane 40 in the humidified state. For example, when operation of the fuel cell stack 10 is stopped, and the temperature of the fuel cell stack 10 becomes low, the water is condensed in the oxygen-containing gas supply pipe 82 of the manifold 80 (see FIG. 4), and as a result, the condensed water W is produced.

In the embodiment of the present invention, the tapered through hole 88 of the intermediate joint 86 is connected to the oxygen-containing gas supply channel 84 of the oxygen-containing gas supply pipe 82. The inner diameter of the tapered through hole 88 is increased toward the oxygen-containing gas supply passage 34a of the outer insulating plate 18. Stated otherwise, the inner diameter of the tapered through hole 88 is increased toward the downstream side in the flow direction of the oxygen-containing gas. Therefore, in the case where the condensed water W is produced, the condensed water W flows along the inner wall of the tapered through hole 88, and the condensed water W flows easily toward the outer insulating plate 18.

Further, the step ST corresponding to the thickness of the intermediate joint 86 is formed between the intermediate joint 86 and the inner wall of the oxygen-containing gas supply passage 34a of the outer insulating plate 18. The gravity is applied to the condensed water W which reached the outlet end (downstream opening) of the tapered through hole 88. That is, by the gravity, droplets of the condensed water W fall easily onto the inner wall of the oxygen-containing gas supply passage 34a of the outer insulating plate 18.

Further, the sizes of the annular projection 92 in the vertical direction and the lateral direction, provided adjacent to the oxygen-containing gas supply passage 34a of the inner insulating plate 17 is smaller than the sizes of the oxygen-containing gas supply passage 34a of the outer insulating plate 18 in the vertical direction and the lateral direction. Therefore, the water droplets of the condensed water W dropped onto the inner wall of the oxygen-containing gas supply passage 34a of the outer inner insulating plate 18 need to go up along the annular projection 92 in opposition to the gravity, to intrude into the oxygen-containing gas supply passage 34a of the inner insulating plate 17. Therefore, it is difficult for droplets of the condensed water W which dropped onto the inner wall of the oxygen-containing gas supply passage 34a of the outer insulating plate 18 to reach the downstream side of the oxygen-containing gas supply passage 34a.

On the other hand, as described above, the starting point of the bypass channel 94 as described above is positioned below the annular projection 92. Since the gravity is applied to the condensed water W, the condensed water flows downward easily, and intrudes into the bypass channel 94. The condensed water W is guided to the lower oxygen-containing gas discharge passage 34b2 through the bypass channel 94 (see FIG. 5). Thereafter, the condensed water W is discharged from the end plate 20a to the outside.

As described above, in the embodiment of the present invention, the condensed water W in the tapered through hole 88 of the intermediate joint 86 can be discharged to the outside through the bypass channel 94 easily. Thus, it is possible to prevent intrusion of the condensed water W from the oxygen-containing gas supply passage 34a of the cell stack body 14 into the power generation cell 12. Therefore, it is possible to avoid the situation, e.g., where the oxygen-containing gas flow field 48 (reactant gas flow field) in the cell stack body 14 is closed, and shortage of the oxygen-containing gas (reactant gas) occurs in each of the power generation cells 12.

Accordingly, it is possible to effectively prevent decrease in the power generation performance due to instability of the cell voltage and/or decrease in the cell voltage. Additionally, degradation of the electrolyte membrane and/or the electrode catalyst due to water retained in the cell stack body 14, and corrosion of the separators are prevented. Accordingly, the product life of the fuel cell stack 10 is extended advantageously.

The present invention is not limited to the embodiment described above. Various modifications may be made without departing from the gist of the present invention.

For example, the bypass channel 94 may be provided over an area from the fuel gas supply passage 38a to the lower fuel gas discharge passage 38b2.

Further, the bypass channel 94 in the form of grooves may be formed in an end surface of the outer insulating plate 18 facing the inner insulating plate 17.

Further, both of the bypass channel 94 extending over an area from the oxygen-containing gas supply passage 34a to the lower oxygen-containing gas discharge passage 34b2 and the bypass channel 94 extending over an area from the fuel gas supply passage 38a to the lower fuel gas discharge passage 38b2 may be provided. In this case, one of the bypass channels 94 is formed in the inner insulating plate 17, and the other of the bypass channels 94 is formed in the outer insulating plate 18. In the case where an intersection point is formed between both of the bypass channels 94, a lid may be provided at the intersection to prevent both of the reactant gases from mixing together at the intersection.

What is claimed is:
1. A fuel cell stack comprising:
a cell stack body comprising a plurality of power generation cells stacked in a stacking direction, the power generation cells each including an electrolyte electrode assembly, and separators sandwiching the electrolyte electrode assembly, the electrolyte electrode assembly including an electrolyte, and an anode and a cathode provided on both sides of the electrolyte; and
terminal plates, insulating plates, and end plates provided at both ends of the cell stack body,
wherein a single reactant gas supply passage configured to supply a reactant gas to be supplied to the anode or the cathode, and a first reactant gas discharge passage and a second reactant gas discharge passage configured to communicate with the single reactant gas supply passage, respectively, and discharge branched flows of a partially consumed reactant gas discharged from the anode or the cathode, extend through at least the cell stack body, the insulating plates, and the end plates in the stacking direction;
the reactant gas supply passage is formed at one end of the cell stack body in a horizontal direction, and the first reactant gas discharge passage and the second reactant gas discharge passage are formed at another end of the cell stack body in the horizontal direction;
the first reactant gas discharge passage is positioned below the reactant gas supply passage, and the second reactant gas discharge passage is positioned above the reactant gas supply passage; and
a bypass channel configured to connect the reactant gas supply passage and the first reactant gas discharge passage is formed between the cell stack body and the end plates.

2. The fuel cell stack according to claim 1, wherein a supply channel of a reactant gas supply pipe member configured to supply the reactant gas to the reactant gas supply passage is connected to the reactant gas supply passage through a joint including a tapered through hole with an opening enlarged toward the end plate in a tapered manner.

3. The fuel cell stack according to claim 2, wherein the joint is inserted up to a position in a middle of the reactant gas supply passage of the insulating plate; and
a step is formed between an outlet end of the tapered through hole and the reactant gas supply passage of the insulating plate.

4. The fuel cell stack according to claim 2, further comprising a second insulating plate including the reactant gas supply passage, the first reactant gas discharge passage, and the second reactant gas discharge passage between the insulating plate and the terminal plate;
wherein an annular projection oriented to the reactant gas supply passage of the insulating plate is formed around the reactant gas supply passage of the second insulating plate; and
an outer diameter of the annular projection is smaller than an inner diameter of the reactant gas supply passage of the insulating plate.

5. The fuel cell stack according to claim 4, wherein the bypass channel is formed between the insulating plate and the second insulating plate.

6. The fuel cell stack according to claim 5, wherein the bypass channel starts from a position below the annular projection.

7. The fuel cell stack according to claim 1, wherein the bypass channel is formed between the reactant gas supply passage configured to supply an oxygen-containing gas to the cathode and the first reactant gas discharge passage of the two reactant gas discharge passages configured to discharge a partially consumed oxygen-containing gas discharged from the cathode.

* * * * *